July 20, 1948. G. E. KING 2,445,439
MOTOR CONTROL SYSTEM
Filed Feb. 5, 1947
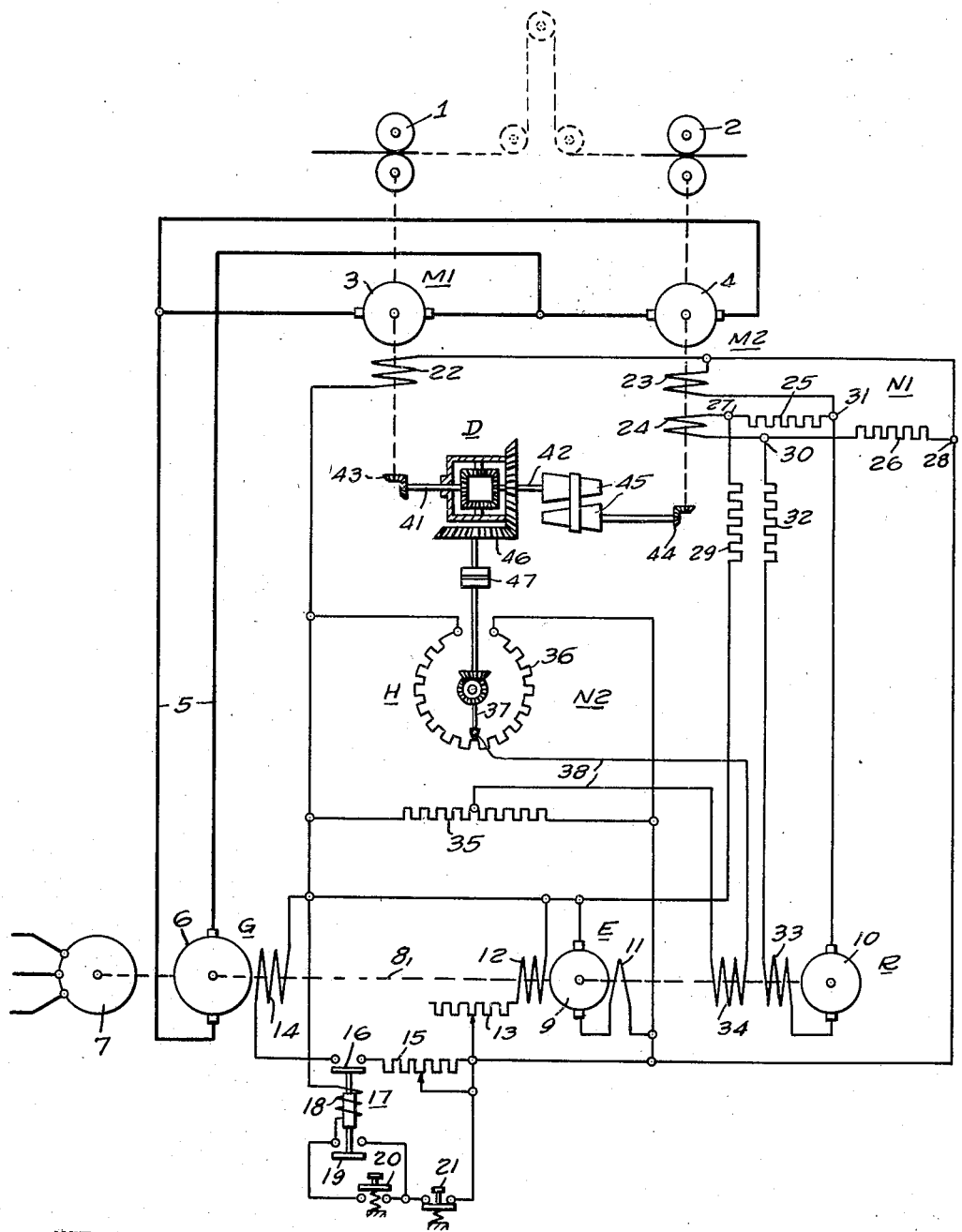
WITNESSES:
E. A. McCloskey
[signature]
INVENTOR
George E. King.
BY
[signature]
ATTORNEY Patented July 20, 1948

2,445,439

UNITED STATES PATENT OFFICE 2,445,439

MOTOR CONTROL SYSTEM

George E. King, Swissvale, Pa., assignor to Westinghouse Electric Corporation, East Pittsburgh, Pa., a corporation of Pennsylvania Application February 5, 1947, Serial No. 726,463

6 Claims. (Cl. 318—76)

My invention relates to control systems for variable-voltage, direct-current drives which regulate the speed of two or more drive motors in such a manner as to maintain a desired speed or positional relation between these motors regardless of changes in speed adjustment. Such systems are in use for fabricating machinery in which several separately driven machine sections or line shafts are to operate simultaneously at accurately matched or otherwise correlated speeds as is the case, for instance, with sectional paper machines, or the grinding, polishing and return lines of plate glass machinery.

A known way of obtaining such a speed-matching control involves the use of a carbon pile regulator. This regulator is actuated by a mechanical differential gear, which is input-connected between two motors so that any difference in the motor speeds changes the pressure applied to the carbon pile and hence varies the resistance of the regulator; and this change in resistance is used to vary the speed of one motor to make it match the speed of the other motor.

It is an object of my invention to provide a speed-matching control system of the above-mentioned general type which insures a high accuracy of performance within a wide range of adjustable driving speeds, and reduces the maintenance work to a very considerable extent as compared with systems operating with carbon pile devices.

To this end, and in accordance with a feature of the invention, I provide the control system with a regulating generator, preferably of the amplifying type, which serves to regulate the relative speed of the drive motors so as to maintain these motors in a desired speed or positional relation to each other, and I control the field excitation of this generator by means of a differentially adjusted rheostat, preferably in a balanceable bridge network, in the manner explained below with reference to the embodiment illustrated in the drawing.

According to the drawing, two sections or machine units 1 and 2 of a composite machinery, such as a paper mill, are driven from the armatures 3 and 4 of two respective direct-current motors. The motor armatures 3 and 4 are connected in parallel to a direct-current load circuit 5 which is energized by adjustable voltage from the armature 6 of a main generator G. The main generator is driven by a constant speed motor 7, and its shaft 8 carries also the armature 9 of an exciter E and the armature 10 of a regulating generator R of the amplifying type. The exciter E is shown to have a series field winding 11 and a shunt field winding 12. The circuit of the shunt field winding 12 includes a rheostat 13 which permits adjusting the constant output voltage of the exciter and, as a rule, has a fixed setting during the performance of the system. The constant exciter voltage is applied to the field winding 14 of the main generator G, and a rheostat 15 is provided to permit varying the generator excitation in order to thereby adjust and change the speed of the two drive motors M1 and M2. Due to the parallel connection of the motor armatures 3 and 4, the two motors run approximately at the same speeds for any selected setting of the field rheostat 15, assuming that the two motors are similar as to the rating and design of their respective armatures and fields.

The connection of the main generator field winding 14 to the constant voltage buses of the exciter E is controlled by the contact 16 of a contactor 17 whose control coil 18 actuates also a self-sealing contact 19. The coil circuit of contactor 17 is connected across the exciter mains under control by a normally open start contact 20 and a normally closed stop contact 21, both shown to be of the push-button type. When the motor generator set is running at normal speed, the control system can be energized by closing the contact 20. This has the effect of closing the contactor 17 so that the field circuit of generator G becomes closed and the contactor 17 sealed in at contact 19. The drive system can thereafter be stopped at any time by opening the contact 21.

The motor M1 has its field winding 22 connected across the exciter mains and hence receives constant field excitation. The field of motor M2 is provided with two field winding sections 23 and 24. These two sections are connected in a network N1 of the Wheatstone bridge type so that they form two of the four bridge branches of this network, the two other branches consisting of impedance devices, such as the resistors denoted by 25 and 26. The pair of diagonal points of the bridge network denoted by 27 and 28 are connected across the exciter mains in series with an adjusting rheostat 29. Relative to the exciter mains, the two winding sections 23 and 24 are connected in parallel so that both receive constant excitation. This excitation is cumulative, and its resultant field of motor M2 is equivalent to the field provided by the winding 22 in motor M1.

The armature 10 of the regulating generator R is connected across the other pair of bridge diagonal points 30 and 31 in series with a calibrating resistor 32 and also in series with a self-excited field winding 33 of the regulating generator R. When voltage is generated in the armature 10, this voltage is superimposed upon the above-mentioned constant field excitation of the motor field windings 23 and 24 and has the effect of increasing or reducing the resultant field of motor M2 depending upon whether the corrective voltage of the regulating generator R has one or the other polarity. The corrective voltage, and the modifying effect caused thereby on the field excitation of motor M1, are controlled by a separately excited field winding 34 in the regulating generator. The field winding 34 receives excitation from another balanceable network N2, exemplified by a Wheatstone bridge arrangement, which comprises a tapped resistor 35 and a rheostat H whose resistor 36 is engaged by a movable contact member 37. The output or zero diagonal 38 of network N2 includes the control field winding 34 of the regulating generator. The network N2 is energized from the exciter mains. When the adjusting member 37 is in the illustrated balance position, the voltage across the diagonal branch 38 is zero so that the control field winding 34 receives no excitation. Consequently, under this condition, the corrective voltage generated by the regulating generator is zero, and the field excitation of the motor M1 is determined only by the constant excitation derived from the exciter mains and is substantially equal to the field excitation in motor M1. When the adjusting member 37 of rheostat H departs in either direction from the illustrated balance position, the diagonal branch 38 of the network N2 impresses a control voltage on the control field winding 34, and the polarity and magnitude of this control voltage depend upon the direction and extent of the departure of the adjusting member 37 from the balance position. Then, a corrective voltage is generated in generator R whose polarity is also in accordance with the deflection of the rheostat adjusting member from the balance position and whose magnitude, in a considerably amplified degree, corresponds to the extent of that deflection.

The rheostat adjusting member 37 is actuated by means of a differential transmission D which has two input shafts 41 and 42 driven through respective gears 43 and 44 from the shafts of the motors M1 and M2, respectively. A speed-change transmission 45 is shown to be inserted between the motor M2 and the input shaft 42 of the differential transmission D in order to permit adjusting a desired speed relation between the two motors. The output shaft 46 of the differential transmission is connected to the rheostat member 37 by means of a frictional slip coupling 47.

As long as the motors M1 and M2, during their simultaneous operation, maintain the desired speed or positional relation to each other, the output shaft 46 of the differential mechanism and the adjusting member 37 of rheostat H remain at rest in the illustrated balance position. Then, as explained above, the regulating generator R supplies no voltage to the network N1. If one of the two motors runs faster than is required by the desired performance relation, then the output shaft 46 of the differential transmission will revolve with the effect of deflecting the rheostat member 37 from the balance position in the direction and to an extent indicative of the departure of the motors from the desired relative condition. As a result, the generator R imposes a corrective voltage on the bridge network N1 and thereby modifies the resultant field excitation in motor M2 in the sense and by the amount required to minimize the departure from the desired operational relation of the two motors. In consequence, the system has the effect of maintaining the speed or positional relation between the two motors at the desired value regardless of the adjusted operating speed of these motors. If more than two motors are provided in the machinery to operate in proper relation to one another, another control system of the kind described and illustrated, or as many of such systems as may be needed, can be used, for instance, so that one motor (M1) receives constant field excitation in accordance with the above described embodiment while all other motors have their field excitation controlled by a corresponding number of differential transmissions and associated electric devices similar to those described above.

As mentioned, the regulating generator R is preferably of the amplifying type. The particular regulating generator shown and described in this disclosure achieves the desired amplifying effect by means of the self-excited field winding 33. The circuit of this field winding is so calibrated with the aid of the resistor 32 that the resistance characteristic coincides approximately with the air gap line or no load saturation characteristic of the generator R, it being understood that this generator during normal performance operates in the substantially linear and unsaturated portion of this magnetic characteristic. Under these conditions, the field excitation in generator R required to sustain the output voltage (corrective voltage) of this generator is supplied substantially by the self-excited field winding 33 so that the control field winding 34 is merely called upon to provide the control impulse needed to shift the operating point of the generator upward or downward along its operating characteristic. As a result, a weak control voltage derived from the rheostat network N2 will produce and control as to direction and magnitude a highly amplified voltage generated in the armature 10. It should be understood, however, that other kinds of amplifying generators, for instance, those of the armature reaction excited type are likewise applicable.

It will be understood by those skilled in the art that control systems according to my invention can be modified and altered in other respects without departing from the principles of the invention and within the scope of the essential features of the invention as set forth in the claims annexed hereto.

I claim as my invention:

1. A control system, comprising two variable-speed direct-current motors having respective armatures and field means, circuit means attached to said armatures for providing adjustable voltage therefor, circuit means attached to said field means for supplying excitation therefor, a regulating generator having an armature circuit connected to the field means of at least one of said motors for imposing thereon a corrective voltage in order to modify the corresponding field excitation, said generator having a control field means for controlling said corrective voltage, an energizing circuit attached to said control field means and including an adjustable rheostat having a movable adjusting member, a differential transmission having an output member connected to said adjusting member and having two input members connected to said respective motors so as to change the adjustment of said movable member in accordance with the departure of said motors from a given positional relation to each other, thus causing said corrective voltage to change the relative field excitation of said motors in the direction required to minimize said departure.

2. A control system, comprising two variable-speed direct-current motors having respective armatures and field means, circuit means attached to said armatures for providing adjustable voltage therefor, circuit means attached to said field means for supplying excitation therefor, a regulating generator having an armature circuit connected to the field means of at least one of said motors for imposing thereon a corrective voltage in order to modify the corresponding field excitation, said generator having a control field means for controlling said corrective voltage, an energizing circuit of the bridge type having a balance-controlling rheostat equipped with a movable adjusting member, said energizing circuit having a diagonal branch attached to said control field means for applying to the latter a control voltage depending in polarity and magnitude on the departure of said movable member from the balance position, a differential transmission having an input shaft connected to said movable member to position the latter and having two input shafts connected to said respective motors so as to change the adjustment of said movable member in accordance with the departure of said motors from a given positional relation to each other, thus causing said corrective voltage to change the relative field excitation of said motors in the direction required to minimize said latter departure.

3. A control system, comprising two variable-voltage direct-current drives having two respective motors to operate at correlated speeds and including first circuit means for providing adjustable armature voltage and second circuit means for providing field excitation for said motors, one of said motors having field means for modifying the field excitation in said latter motor so as to vary accordingly the speed of the latter motor, a regulating generator having an armature connected to said field means to impose a reversible corrective voltage thereon and having a control field winding for controlling said corrective voltage, a potentiometric circuit having a balanceable branch attached to said control field winding, said circuit including a rheostat having a movable adjusting member for controlling the voltage across said branch as to polarity and magnitude in dependence upon the direction and extent of departure of said member from a given balance position, a differential transmission having an input shaft connected to said movable member to position the latter and having two input shafts connected to said respective motors so as to change the adjustment of said movable member in accordance with the departure of said motors from a given positional relation to each other thus causing said corrective voltage to change the relative field excitation of said motors in the direction required to minimize said latter departure.

4. A control system, comprising two variable-voltage direct-current drives having two respective motors to operate at correlated speeds and including first circuit means for providing adjustable armature voltage and second circuit means for providing field excitation for said motors, one of said motors having two field windings, a bridge circuit having four bridge branches and two pairs of diagonal points of which one pair is connected with said second circuit means, said two field windings being connected in two of said branches to be cumulatively excited from said second circuit means, a regulating generator having an armature connected across said other pair of diagonal points for superimposing on said two field windings a corrective voltage of reversible polarity, said regulating generator having control field means for controlling said corrective voltage, circuit means attached to said control field means for applying reversible excitation thereto and comprising rheostat means having a movable member for controlling said excitation as to polarity and magnitude depending upon the direction and extent of departure of said member from a given position, a differential transmission having an input shaft connected to said movable member to position the latter and having two input shafts connected to said respective motors so as to change the adjustment of said movable member in accordance with the departure of said motors from a given positional relation to each other, thus causing said corrective voltage to change the field excitation of said one motor in the direction required to minimize said latter departure.

5. A control system, comprising two variable-voltage direct-current drives having two respective motors to operate at correlated speeds and including first circuit means for providing adjustable armature voltage and second circuit means for providing field excitation for said motors, one of said motors having two field windings, a bridge circuit having four bridge branches and two pairs of diagonal points of which one pair is connected with said second circuit means, said two field windings being connected in two of said branches to be cumulatively excited from said second circuit means, an amplifying generator having an armature and a self-excited field winding connected across said other pair of diagonal points for superimposing on said two field windings a corrective voltage of reversible polarity, said regulating generator having a separately excited control field winding for controlling said corrective voltage, a bridge network having a diagonal branch attached to said control field winding for applying reversible control voltage thereto and having a potentiometer rheostat provided with a movable adjusting member for controlling said control voltage, a differential transmission having an input shaft connected to said movable member to position the latter and having two input shafts connected to said respective motors so as to change the adjustment of said movable member in accordance with the departure of said motors from a given positional relation to each other, whereby said corrective voltage is caused to change the relative field excitation of said motors in the direction required to minimize said departure.

6. A control system, comprising two variable-speed direct-current motors having respective armatures and field windings, a main generator connected to said two motor armatures to apply adjustable voltage thereto, circuit means for providing constant voltage, said field winding of one of said motors being connected to said circuit means, said field winding of said other motor having two winding sections, an impedance network of the bridge type containing said two winding sections and having two pairs of diagonal points of which one pair is connected to said circuit means for cumulatively exciting said two winding sections by constant voltage, an amplifying generator having an armature connected across said other pair of diagonal points for superimposing on said winding sections a reversible corrective voltage for modifying the excitation of said winding sections to thereby regulate the speed of said other motor, said amplifying generator having a control field winding, another impedance network of the bridge type having a rheostat provided with a movable adjusting member, said latter network being connected with said control field winding for applying a reversible control excitation thereto depending upon the departure of said member from a given position, a differential transmission having an input shaft connected to said movable member to position the latter and having two input shafts connected to said respective motors so as to change the adjustment of said movable member in accordance with the departure of said motors from a given positional relation to each other, thus causing said corrective voltage to change the relative field excitation of said motors in the direction required to minimize said latter departure.

GEORGE E. KING.